Feb. 28, 1967  A. J. ARNOLD ETAL  3,306,426

ROTARY CONVEYER APPARATUS

Filed Feb. 19, 1965  13 Sheets-Sheet 1

INVENTORS
William M. Ripple
Alanson J. Arnold

BY *Frank J. Jordan*

ATTORNEY

INVENTORS
William M. Ripple
Alanson J. Arnold

BY Frank J. Jordan
ATTORNEY

United States Patent Office 3,306,426
Patented Feb. 28, 1967

3,306,426
ROTARY CONVEYOR APPARATUS
Alanson J. Arnold, New Orleans, and William M. Ripple, Metairie, La., assignors to American Radiator & Standard Sanitary Corporation, New York, N.Y., a corporation of Delaware
Filed Feb. 19, 1965, Ser. No. 434,085
12 Claims. (Cl. 198—33)

This invention relates to an apparatus for conveying articles to various operating stations where a coating is applied to the articles. More particularly the invention relates to a conveyor which is operable to receive articles from one conveyor, manipulate and convey such articles through various operating stations in a spray apparatus, and thereafter transfer the articles to another conveyor.

As is well known in the art, green ceramic ware is sprayed and coated with an enamel glaze so that upon final firing thereafter, the coating will harden and provide a smooth, hard and easy to clean surface. Heretofore, this green ceramic ware has been sprayed manually with spray guns. Such spraying varied from individual to individual so that a uniform coating of sprayed material was not always obtained. Also, the manual spraying resulted in the spray permeating the atmosphere and making it difficult for the workers to perform their job. In addition, the manual handling of the ceramic ware in transferring it to and from a spray booth was time consuming and burdensome to the workers.

The present invention is particularly adaptable for handling water closet flush tanks and transferring them from a straight line conveyor to a rotary conveyor where the tanks are carried through various spraying stations of a spray apparatus which applies the enamel glaze.

Since these tanks are generally adapted to be used with the backs thereof mounted against a wall, it is not necessary to apply the coating of glaze material to the backs of the tank. According to the present invention, therefore, pairs of tanks are adapted to be placed in back-to-back relationship as they are carried through a spraying apparatus such that the vertical walls, that is the front and sides of the tanks, can be sprayed while the backs, which face each other in close relationship, will remain uncoated. Thus instead of handling the tanks individually for spraying, they are handled in pairs to thereby increase the overall efficiency of the spraying process.

The rotary conveyor of the present invention is operable to receive pairs of mated tanks arranged in back-to-back relationship from a straight line conveyor, convey such pairs of tanks through various operating stations of a spray apparatus, rotate the pairs of tanks at one or more of such stations about a vertical axis as a spray nozzle directs the spray to the vertical walls of the tank, and orientate said pairs of tanks as the covers are sprayed and as the tanks are received from a feed conveyor and as they are transferred to an exit conveyor.

It is an object of the present invention to provide an apparatus for handling articles to be coated in which the articles are conveyed through various operating stations to facilitate the application of a spray coating thereof.

Another object is to provide an apparatus for handling articles arranged in back-to-back relationship so that two articles can be handled as a unit as a coating is applied thereto.

Another object is to provide a conveying apparatus which in addition to conveying articles, rotates them as a spray coating is applied and which also orientate them as they are transferred to and from the conveying apparatus.

Another object is to provide an apparatus adaptable to receive articles from one conveyor, convey such articles through a spraying apparatus, and enabling such articles to be transferred to yet another conveyor.

Other objects and features of the invention will appear as the description of the particular physical embodiment selected to illustrate the invention progresses.

For a better understanding of the present invention reference should be had to the accompanying drawings, wherein like numerals of reference indicates similar parts throughout the several views and wherein.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed is for the purpose of description and not of limitation.

Figure 1:
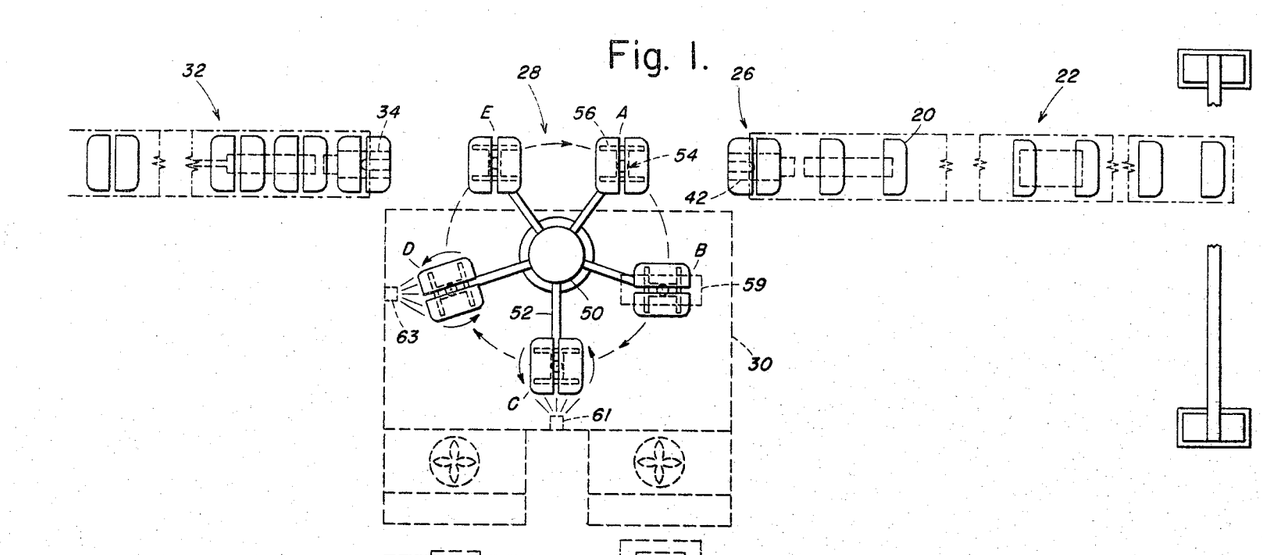
FIGURE 1 is a plan view of the present invention showing the path of movement of the tanks as they are fed to and moved from the spray apparatus.
Figure 2:
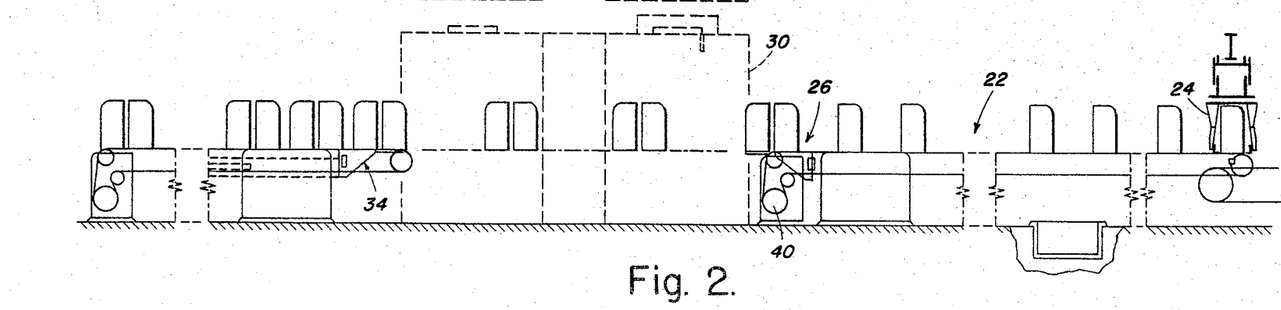
FIGURE 2 is an elevational view of FIG. 1.

Referring to the drawings, FIG. 1 shows the path of travel of the tanks as they are fed to and from a spraying apparatus. The tanks 20 are deposited on a feed conveyor indicated generally at 22 by any suitable means such as by a manipulator 24. The feed conveyor 22 conveys the tanks along a generally straight line to a transfer machine indicated generally at 26. The transfer machine 26 is operable to rotate every other tank 180° to place pairs of tanks back-to-back and thereafter transfer such pairs to a rotary conveyor indicated generally at 28. The rotary conveyor 28 receives the pairs of tanks and carries them through a spray tooth 30 where the tanks are sprayed with an enamel glaze. As the pairs of tanks emerge from the spray booth 30, they are transferred from the rotary conveyor 28 to an exit conveyor indicated generally at 32 by means of the transfer mechanism 34.

The feed conveyor 22 may comprise a straight line belt conveyor comprising one or more endless belts 36

Figure 4:
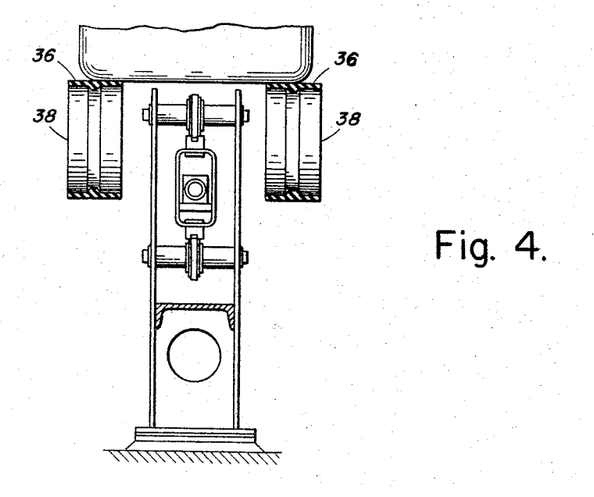
FIGURE 4 is an end view of FIG. 3 partially in section.

(FIG. 4) suitably carried on rollers 38 and powered by a power drive means 40. The conveyor 22 is adapted to be indexed periodically so that after the manipulator 24 deposits a tank 20 on the conveyor belts 36, the latter will be indexed one step to advance the tank and thereby provide an empty space on the conveyor belts 36 ready to receive the next tank from the manipulator 24. It will be seen, therefore, that with this arrangement the tanks are equally spaced on the conveyor 22.

The feed conveyor 22 advances these equally spaced tanks to the transfer device 26 which is located at the longitudinal end of the feed conveyor 22 and which comprises a platform 42 upon which the tanks are deposited and thereafter transferred to the rotary conveyor 28. Details of construction of the transfer means 26 are described more fully in my co-pending application Serial No. 433,921, filed Febuary 19, 1965.

Figure 3:
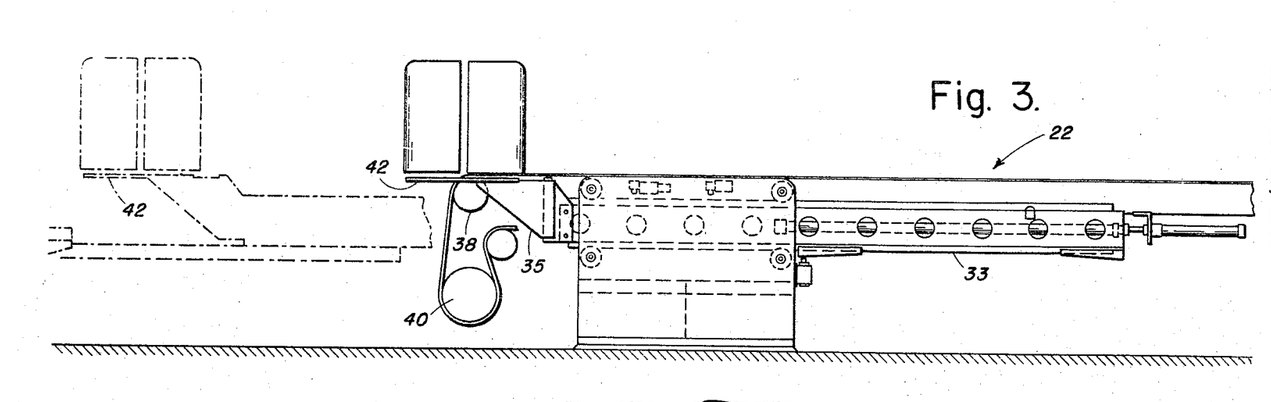
FIGURE 3 is an elevation of the feed conveyor and the transfer mechanism feeding the tanks to the rotary conveyor.

Briefly the transfer means 26 is operable to receive the tanks 20 as they are moved along belt conveyor 36 and thereafter mate pairs of tanks in back-to-back relationship and transfer such pairs to the rotary conveyor, more specifically to the carrier 54 thereof at station A. The tanks move down the feed conveyor belts 36 all facing in the same direction, that is with their backs which do not require a spray coating, facing forward in the direction of advancement. When the first tank of a pair reaches the transfer machine 26, it is turned 180° and thereafter mated with the next tank, which is not turned, in back-to-back relationship. After the tanks are mated, the longitudinal beam 33, which carries the platform 42, is extended from the solid line to the broken line position shown in FIG. 3. While in the broken line position, a frame 35 carried at the end of the beam 33 is lowered slightly by a power cylinder (not shown) to deposit the pair of tanks on the rods 56 of the carrier 54 at station A. The beam 33 is then withdrawn to the full line position shown in FIG. 3 ready to repeat another cycle. The width of the platform 42 is such that it can be accommodated between the spaced rods 56 of the carrier 54. When the beam 33 is extended longitudinally to the broken line position (FIG. 3), the platform 42 is at a slightly higher elevation than the rods 56 so that when the platform 42 is subsequently lowered, as previously described, the tanks will be deposited on the rods 56 as the platform 42 moves to an elevation which is lower than the rods 56 from which it is then subsequently withdrawn longitudinally as previously described.

The rotary conveyor comprises a hub 50 and a plurality of radial arms 52 with the ends of the latter rotatably mounting carriers indicated generally at 54 upon which the pairs of tanks are carried. Carriers 54 comprise spaced parallel bars 56 having a resilient covering 58 (FIG. 6) thereon to protect the tanks which are carried thereon. The spaced bars 56 are carried by cross members 57, the latter in turn being operatively connected to a rotary drive means 60, as hereinafter described.

Figure 5:
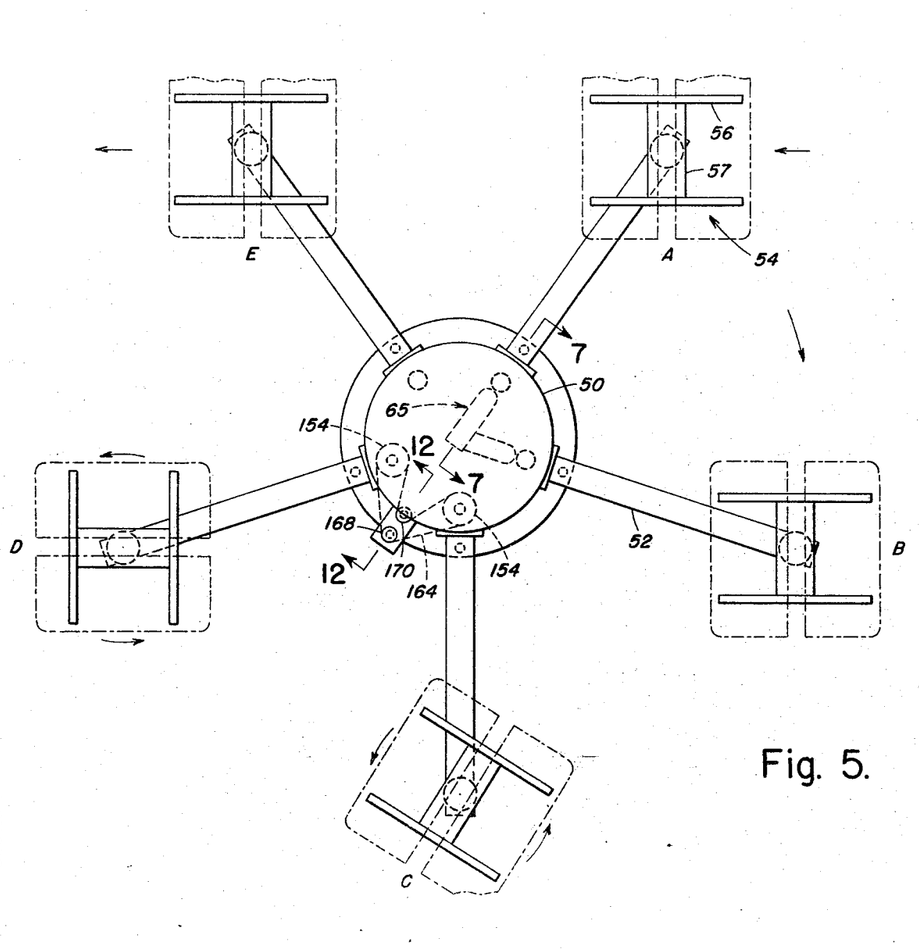
FIGURE 5 is a partial plan view of the rotary conveyor showing the operating stations.

The hub 50 is indexed through stations A through E by an indexing means indicated generally at 65 (FIG. 5). This indexing means 65 when actuated advances the hub 50 one station at a time.

It will be observed in FIG. 1 that the rods 56 are generally parallel to the longitudinal axis of the feed conveyor 22 so that when the transfer machine 26 is ready to deposit a pair of tanks on the rotary conveyor 28, the carrier 54 and the rods 56 thereof will be correctly oriented to receive and support thereon the pair of tanks. For this reason the rods 56 must be parallel to the feed conveyor 22 at station A so that the platform 42 of the transfer device can be accommodated between the rods 56, at which time the platform 42 is lowered slightly to deposit the tanks on the rods 56. Accordingly, orientation devices, as will hereinafter be described are provided to positively orient the platforms 56 to the position shown at station A in FIGS. 1 and 5.

Also the tanks which have their covers sprayed at station B by an overhead spray 59 and the tanks waiting for exit at station E are also orientated by orientation devices to place the tanks in the proper position. At stations C and D, however, the carriers 54 are rotated as spray nozzles 61 and 63, mounted in the spray booth 30 and located laterally at the sides of the tank, direct a spray to the external vertical walls of the tanks. The rotary drive means 60 for rotating the carriers 54 will hereinafter be described in detail.

Figure 6:
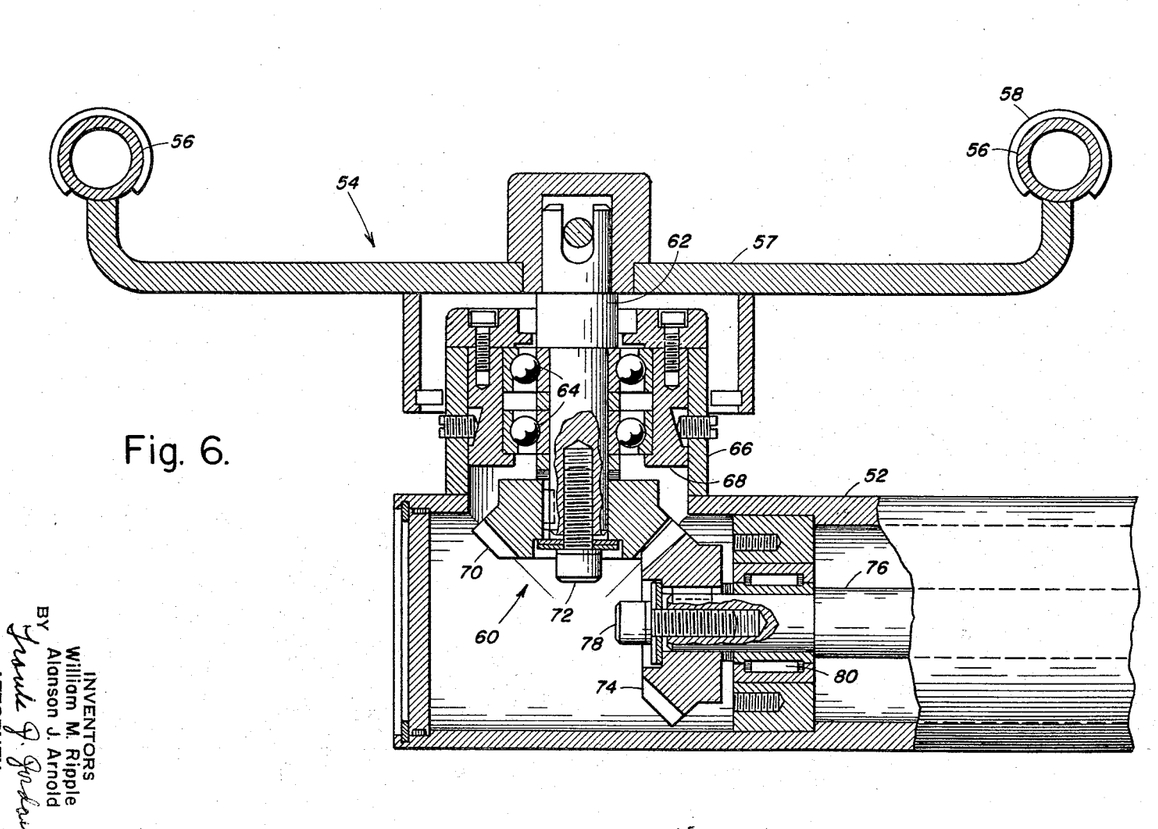
FIGURE 6 is a sectional view of the ends of the radial arms of the rotary conveyor.

Turning to more specific details of the rotary conveyor, FIG. 6 shows the carrier 54 carried on a shaft 62 for rotation therewith. The shaft 62 is rotatably mounted by the bearings 64, the latter in turn being supported on the radial arms 52 by means of the housing 66 and bushing 68. The shaft 62 extends into the hollow radial arm 52 and mounts a bevel gear 70 thereon such as by the threaded member 72. The bevel gear 70 mates with a complementary bevel gear 74 which is rotatable about an axis perpendicular to the axis of shaft 62. The gear 74 is secured to a shaft 76 such as by the threaded member 78. The shaft 76 which is rotatably supported in the hollow radial arm 52 such as by the bearing 80 extends through to the hub 50 of the rotary conveyor. From the above description it will be evident that rotation of shaft 76 will rotate shaft 62 and the carrier 54 carried thereon.

Figure 7:
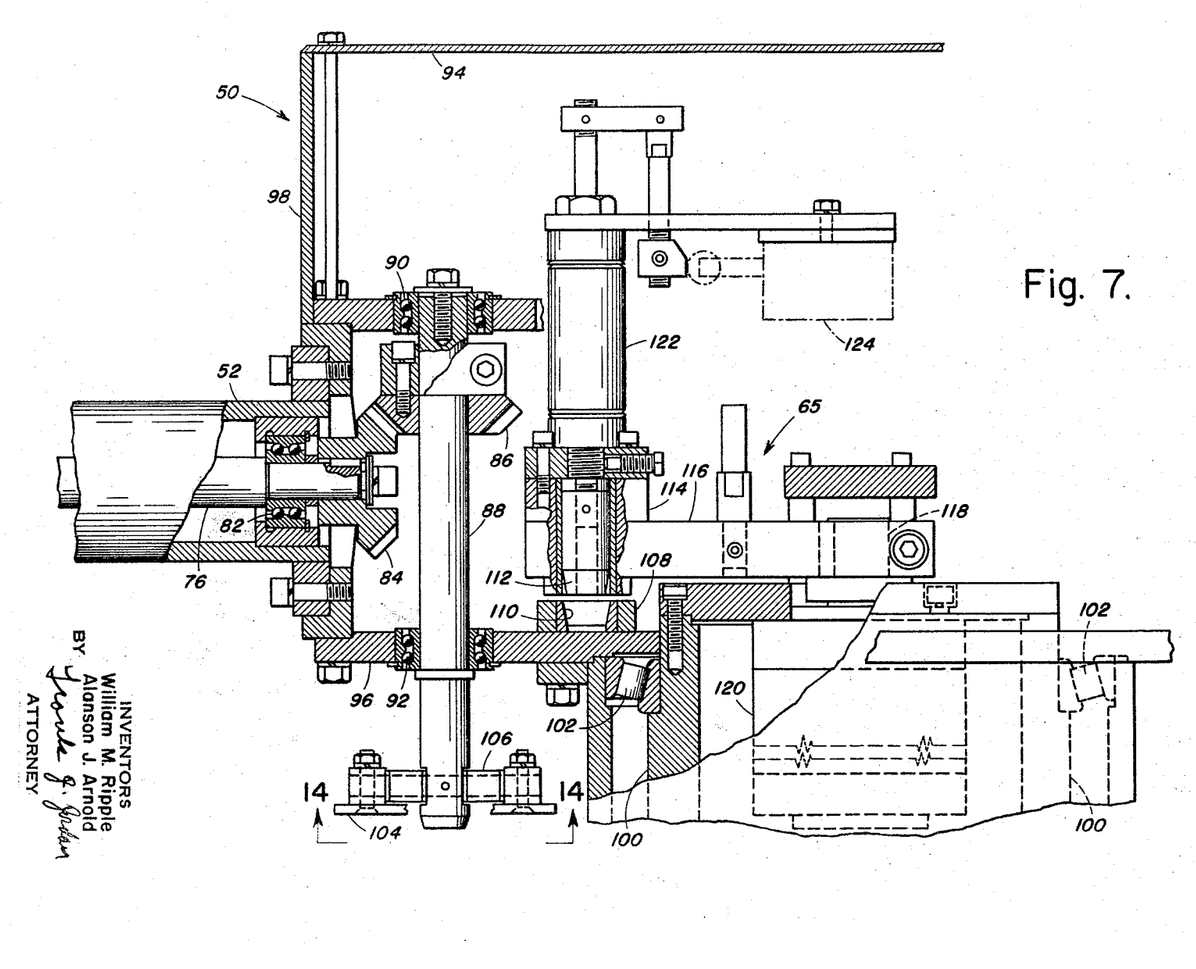
FIGURE 7 is a sectional view taken along line 7—7 of FIG. 5.

As best shown in FIG. 7 the shaft 76 extends to the hub 50 of the rotary conveyor and is suitably rotatably supported adjacent the hub by the bearing 82. The end of the shaft 76 carries a bevel gear 84 which in turn mates with a bevel gear 86, the latter being mounted on a shaft 88 extending vertically and at right angles to the radial shaft 76. The shaft 88 is supported within the hub by the bearings 90 and 92 as can best be seen in FIG. 7.

The hub 50 comprises upper and lower plates 94 and 96 respectively connected by a cylindrical plate 98. The hub 50 is rotatably mounted on a base support 100 by the bearings 102. It will be observed, therefore, that the shaft 88 moves with the hub 50 as the latter rotates on the bearings 102. The lower end of shaft 88 extends below the hub 50 and mounts on the end thereof a clutch plate 104 and orientation cylinders 106. As will be described later, a clutch drive mechanism is operable to engage the clutch plate assembly 104 to rotate the shaft 88 to thereby rotate the carriers 54 as the latter reside in stations C and D and the sides of the tanks are sprayed. As will also be described hereinafter, orientation devices are adapted to engage the orientation cylinders 106 of the clutch plate assembly 104 and orientate the platform to the proper position at stations A, B, and E.

Figure 8:
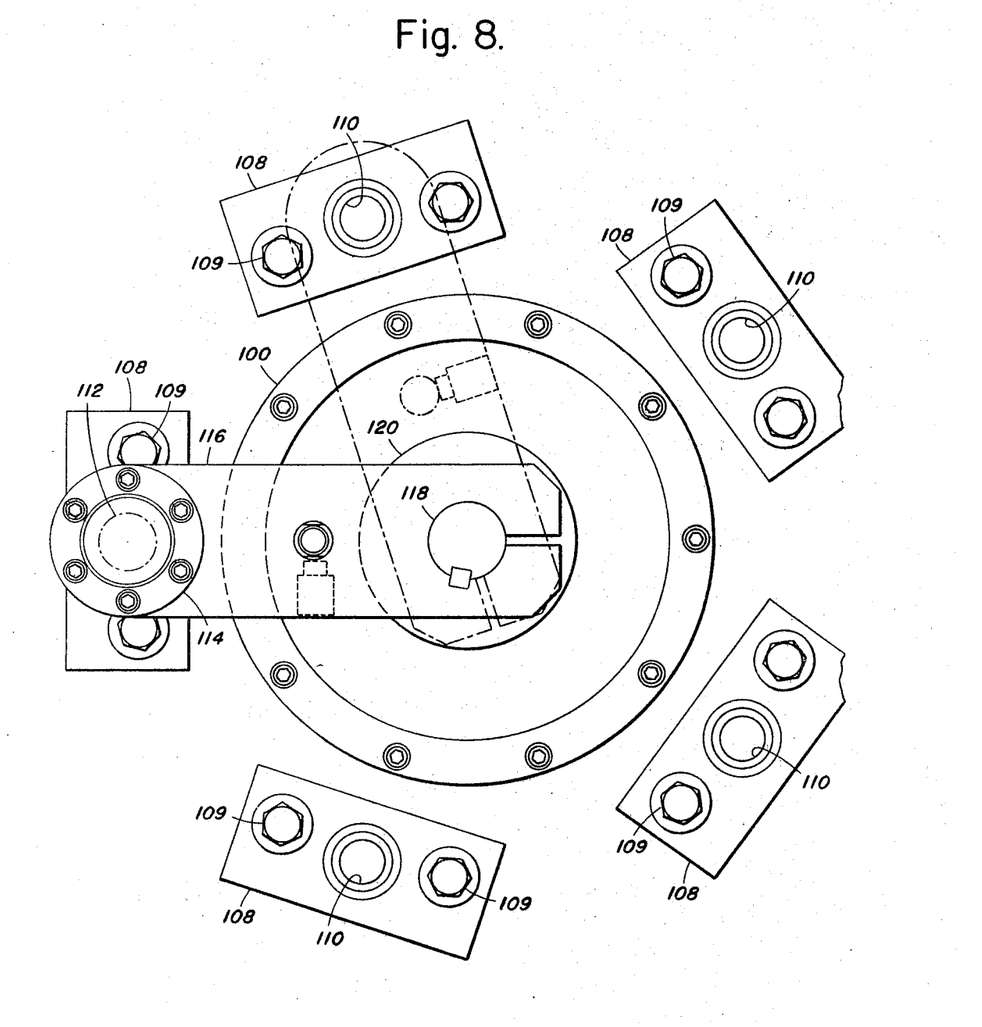
FIGURE 8 is a partial plan view of the rotary conveyor showing the relationship of the mechanism for indexing the rotary conveyor.

The indexing means 65 for indexing the hub to the various stations is best shown in FIGS. 7 and 8. As there shown, the bottom plate 96 of the hub 50 mounts a plurality of smaller plates 108 distributed about the axis of rotation of the hub as shown in FIG. 8. The plates 108 are suitably secured to the bottom hub plate 96 such as by the bolts 109. Each plate has an opening 110 adapted to be engaged by a pin 112 which is reciprocally mounted in a housing 114, the latter in turn being carried by an arm 116. The arm 116 is pivotally mounted on a shaft 118 of a rotary torque actuator 120 such as the Rotac previously mentioned. The rotary torque actuator 120 in turn is mounted on the base support 100 such that the axis of rotation of the actuator shaft 118 is coincident with the axis of rotation of the hub 50.

Suitably mounted on the housing 114 (FIG. 7) is an actuator or power operated cylinder 122 operable to reciprocate the pin 112 to engage and disengage the openings 110 in the plates 108.

The operation of the index mechanism 65 is as follows: When the rotary conveyor is ready to be indexed, the operating cylinder 122 is actuated to engage the pin 112 with the underlying opening 110 in plate 108. Thereafter the rotary device 120 is actuating to pivot the arm 116 clockwise from the solid line to the broken line positions shown in FIG. 8 and thereby rotate the hub 50 so that the carriers 54 are advanced one station. The various spraying and transfer operations are then carried on with the pin 112 extended to maintain the hub in its indexed position. Just prior to the next indexing, the cylinder 122 is actuated to withdraw the pin 112 and the rotary device 120 actuated to rotate the arm 116 counter-clockwise (as viewed in FIG. 8) back to the position it occupied prior to the previous index. Thus the arm 116 alternately pivots back and forth with the pin 112 extended during clockwise movement to rotate the hub 50 in a clockwise direction and the pin 112 withdrawn during counterclockwise pivoting to return the arm 116 to its initial position. Suitable control and safety devices may be provided to control the operation of the rotary device 120 and operating cylinder 122 such as the limit switch 124 which provides a suitable signal to indicate the position of the pin 112.

As can best be seen in FIG. 7, the shaft 88 which rotates the carrier 54 extends, as previously described, from the bottom of the hub 50. There, are, of course, five vertical shafts 88, one for each radial arm 52. Accordingly, as the hub 50 is indexed, the shafts 88 will be moved to different stations overlying the clutch drive mechanisms and the orientation devices previously mentioned.

Figure 9:
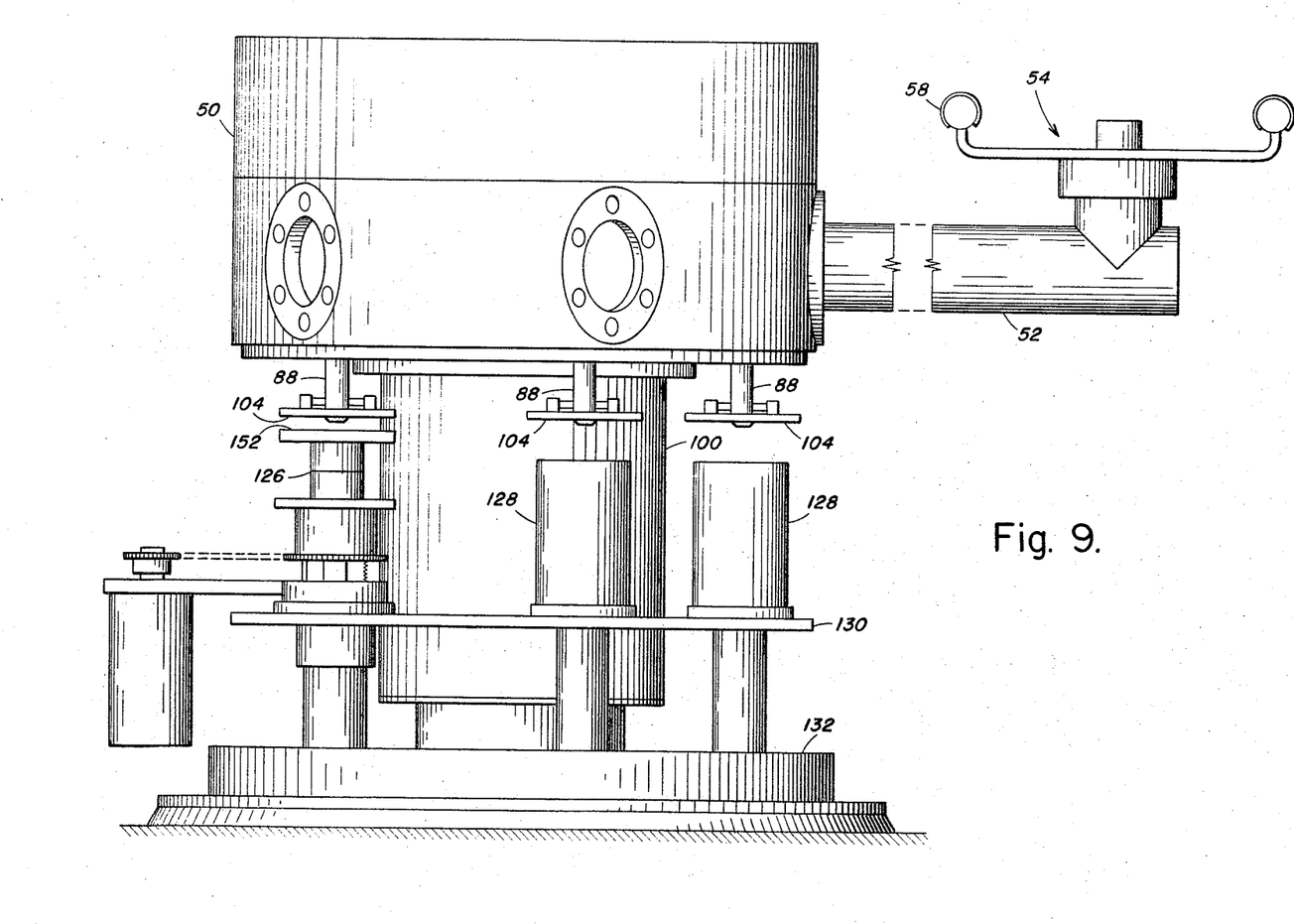
FIGURE 9 is an elevational view showing the clutch drive mechanisms and the orientation cam assemblies.
Figure 10:
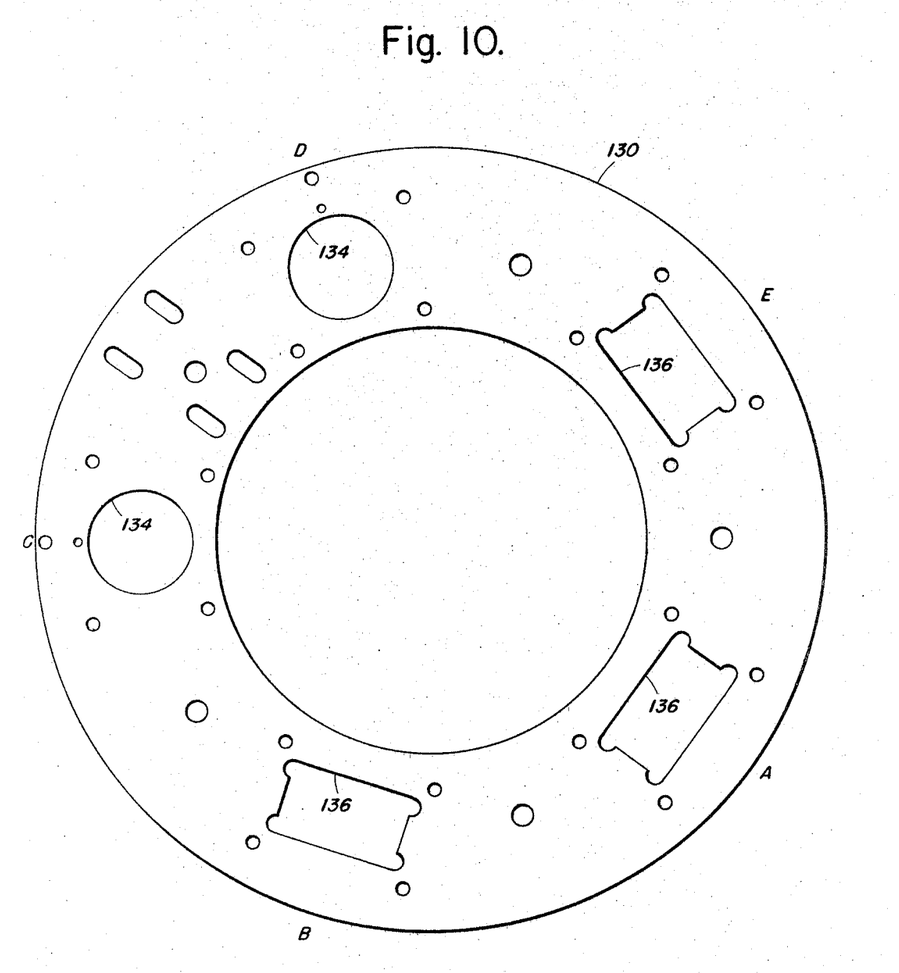
FIGURE 10 is a plan view of the support plate for the clutch drive mechanisms and the orientation cam assemblies.

Peripherally spaced from one another and underlying the hub 50 in the circular path of movement of the clutch plates assembly 104 which include the orientation cylinders 106 are two clutch drive mechanisms 126 located at stations C and D and three orientation devices 128 located at stations A, B, and E. The clutch drive mechanisms 126 and orientation devices 128 are mounted on a stationary plate 130 (FIGS. 9 and 10) suitably supported from a base support 132. A detail of the plate 130 is shown in FIG. 10 wherein the circular cutouts 134 support the two clutch drive mechanisms 126 and the generally rectangular cutouts 136 support the three orientation mechanisms 128.

Figure 11:
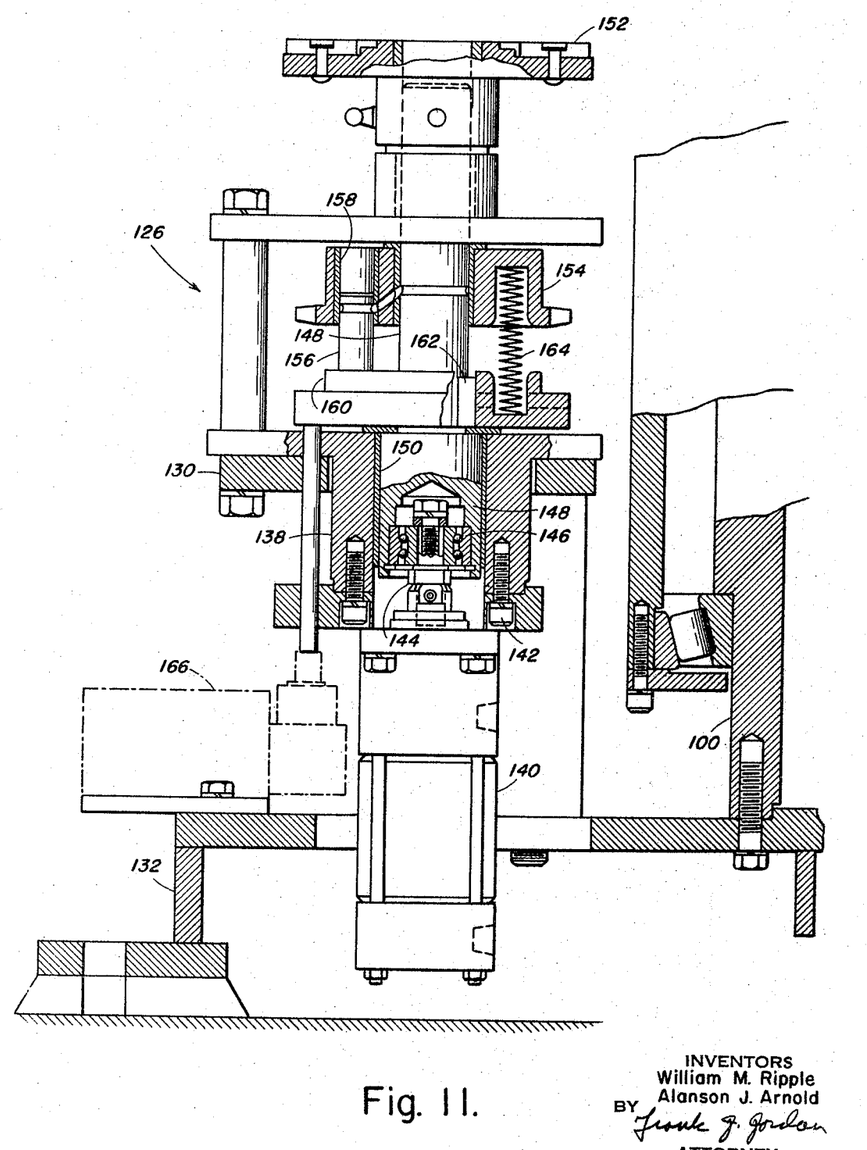
FIGURE 11 is an elevational view partly in section of the clutch drive assembly.

The details of a clutch drive mechanism are shown in FIG. 11. As there shown the plate 130 supports a housing 138 which in turn carries a power cylinder 140 by means of the bolts 142. The end of the piston rod 144 for the cylinder 140 is rotatably received by the bearings 146 within a hollow end portion of a shaft 148. Thus the shaft 148 is free to rotate relative to the piston rod 144. The shaft 148 is rotatably supported in the housing 138 by the sleeve bearing 150. The upper portion of the shaft 148 is stepped down to a smaller diameter and extends upwardly where it mounts a clutch plate 152.

Mounted for rotation with the shaft 148 is a sprocket 154 (this latter sprocket also being shown in FIG. 5). The shaft 148 is longitudinally slidable within the hub of the sprocket 154 but the sprocket rotates with the shaft 148 due to a pin 156 which is longitudinally slidable within an opening 158 in the sprocket. The pin 156 is carried by a flange 160, the latter in turn being secured to the shaft 148 by the key 162. A spring 164 maintains the sprocket 154 in the elevation shown in FIG. 11. The sprocket 154 is driven continuously by the chain 164 (FIG. 5), the latter in turn being driven by drive means hereinafter described. The shaft 148 rotates relative to the piston rod 144 about the bearing 146.

Figure 12:
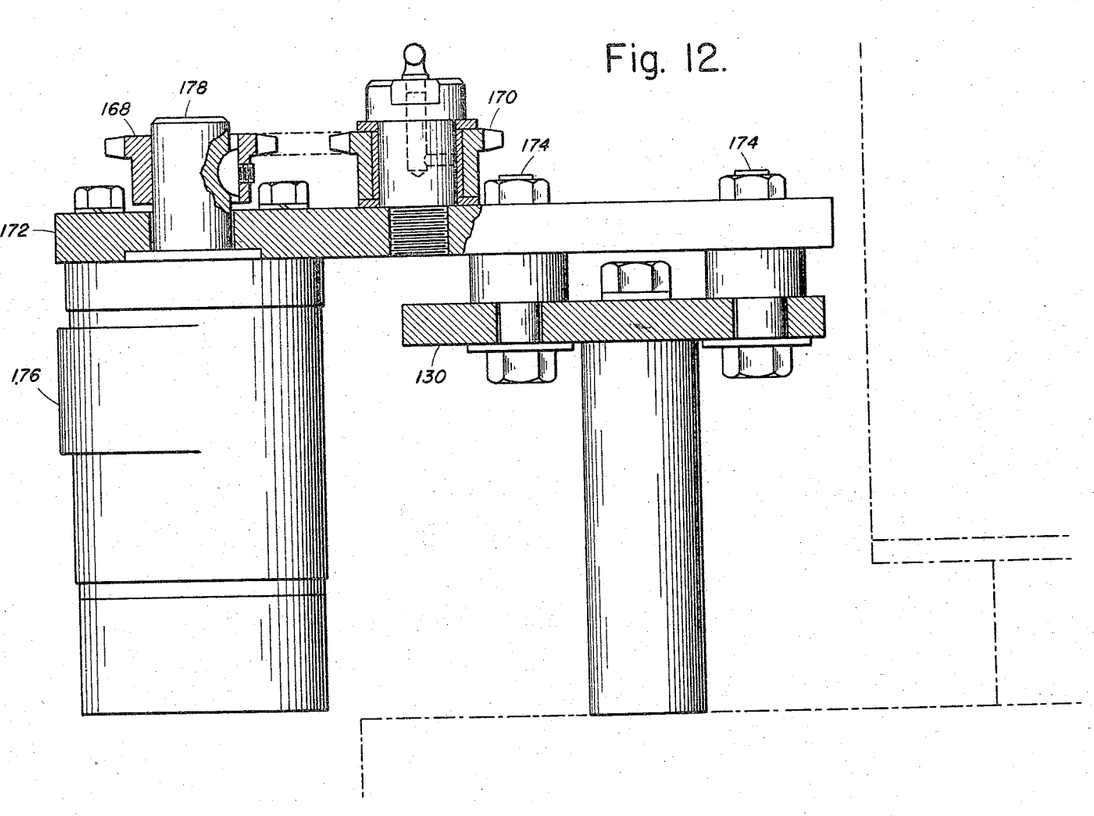
FIGURE 12 is a partial sectional view taken along the line 12—12 of FIG. 5.

The power cylinder 140 is operable to extend the piston rod 144 and the rotating shaft 148 to thereby lift the clutch plate 152 into engagement with an overlying clutch plate 104 carried by the shaft 88 extending from the lower portion of the hub 50. When the clutch plates 104 and 152 are engaged, the carrier 54 is rotated as previously described. After the carrier 54 has been rotated the desired number of times, the cylinder 140 is actuated to withdraw the shaft 148 to its lowered position and thereby disengage the clutch plates. The shaft 148 and pin 156 slide within the respective openings in the sprocket 154 so that the latter always remain at the elevated position shown in FIG. 12. Suitable control and safety means may be provided to control the raising and lowering of the clutch plate 152 such as the limit switch 166.

The means for driving the sprocket 154 comprise a chain 164 (FIG. 5) along with a drive sprocket 168 and idler sprocket 170. These sprockets are rotatably mounted on a bracket 172 (FIG. 12) which in turn is supported on the plate 130 by the bolts 174. The sprocket 168 is driven by a rotary power device 176 through the shaft 178. It will be evident that the sprocket 168 drives the chain 164 which in turn drives the two sprockets 154, the latter in turn continuously driving the clutch plates 152.

Figures 13, 14:
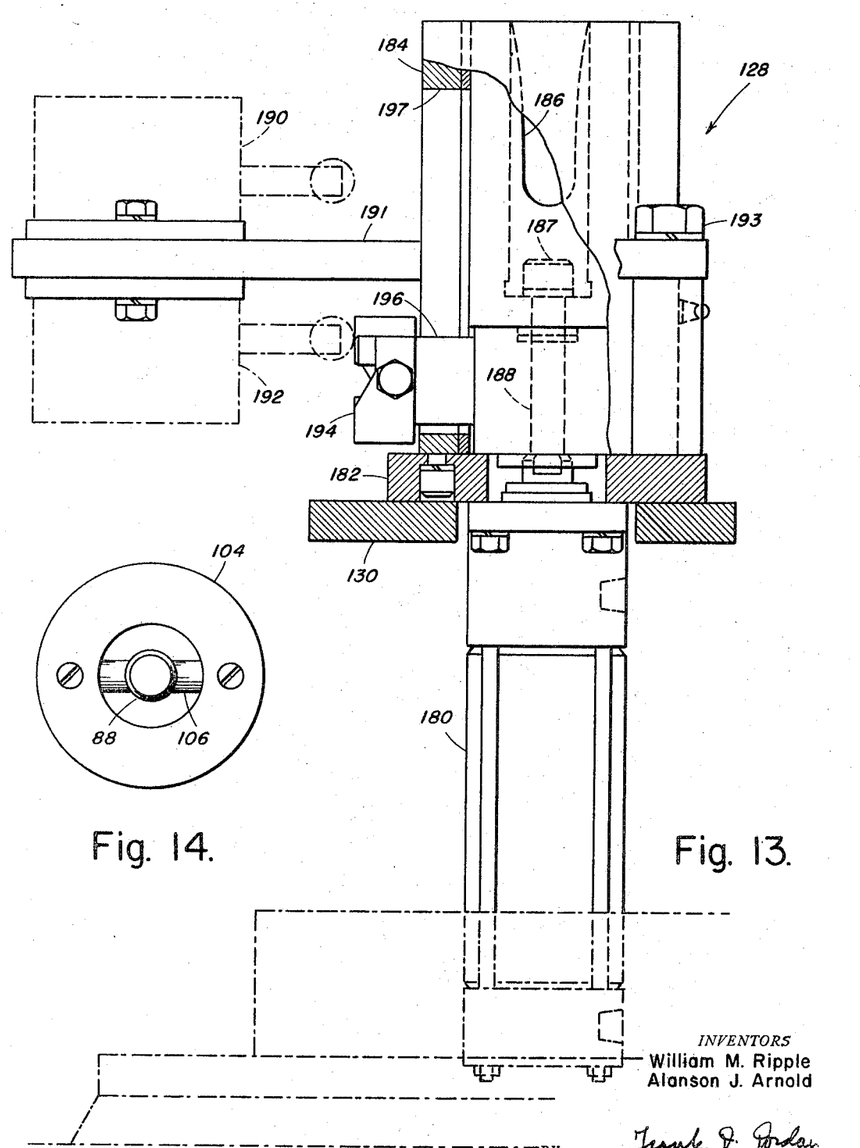
FIGURE 13 is an elevational view partly in section of the orientation cam assembly.
FIGURE 14 is a bottom view of the clutch plate assembly carried by the hub of the radial conveyor.
Figure 15:
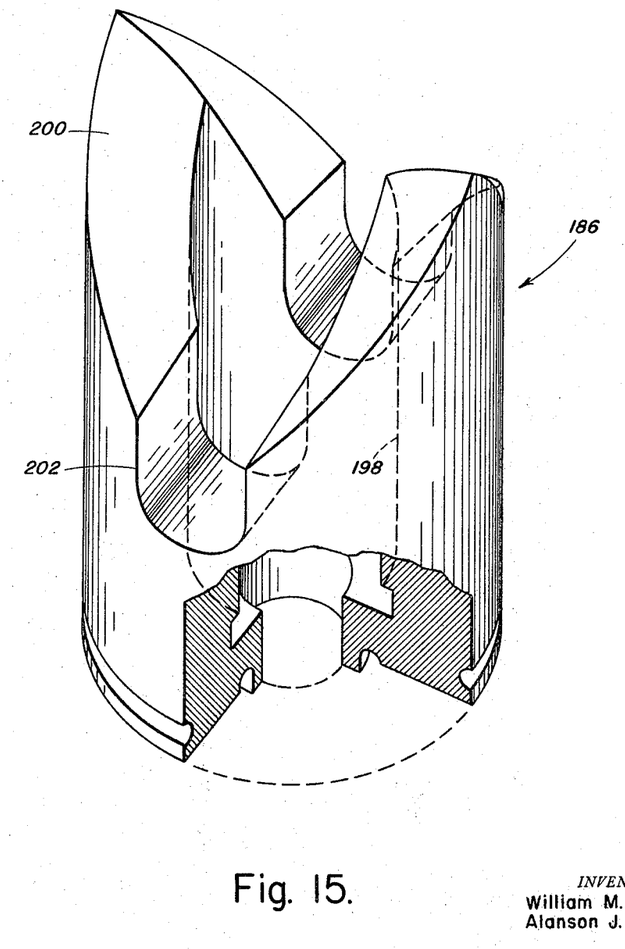
FIGURE 15 is a perspective view of the orientation cam.
Figure 16:
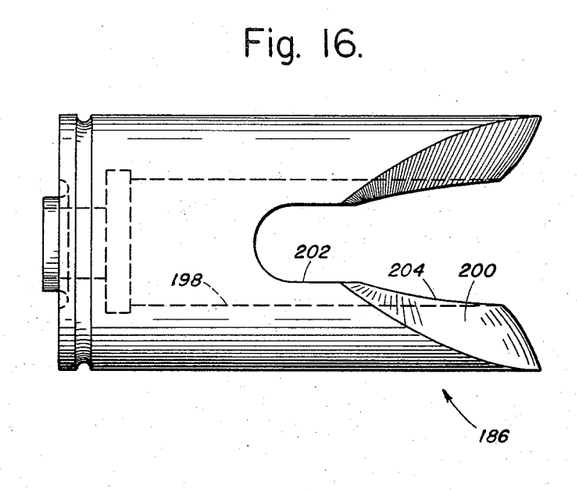
FIGURES 16 and 17 are elevational views of the orientation cam.
Figure 17:
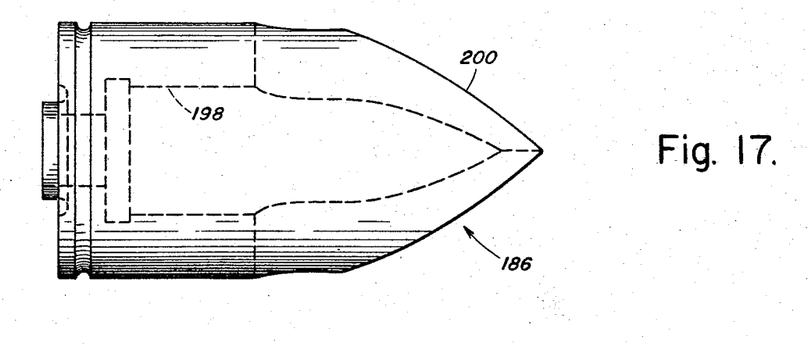
Figure 18:
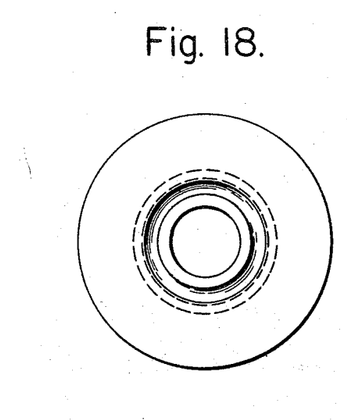
FIGURES 18 and 19 are end views thereof.
Figure 19:
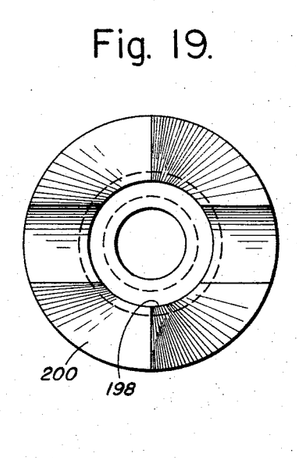

The orentation devices which are located underneath the hub 50 at stations A, B, and E each comprise a power operated cylinder 180 (FIG. 13) mounted on the plate 130 such as by the support member 182 which also support a cylindrical housing 184. Reciprocal within the housing 184 is an orientation cam 186 suitably secured to the piston rod 188 of the power cylinder 180 by the bolt 187. The details of construction of the orientation cam 186 are shown in FIGS. 15 to 19 and is more fully covered in co-pending application Serial No. 433,899, filed February 19, 1965.

Suitable control and safety devices are utilized to control the up and down movement of the orientation cam 186. For example, limit switches 190, 192 fixedly mounted to the plate 130 such as by the bracket 191 and fastener 193 may be actuated by a limit switch actuator 194 which is connected for up and down movement with the piston rod 188 such as by the bracket 196 which rides in an opening 197 in the cylindrical housing 184.

As previously mentioned the cam 186 is raised and lowered to engage and disengage the orientation cylinders 106 (FIGS. 7 and 14) to thereby orientate the carriers 54 at stations A, B and E as previously described. As can best be seen in FIG. 14 the clutch plate 104 carried at the end of shaft 88 is in the form of an annulus and the orientation cylinders 106 project radially from the shaft 88 so that the portion of the orientation cylinders 106 between the inner diameter of the clutch plate 104 and the shaft 88 are adaptable to receive the orientation cam as the latter is raised by the power cylinder 180.

The orientation cam has a bore 198 (FIG. 16) which is slightly larger than the diameter of the shaft 88 so that the bore 198 will accommodate the shaft 88 when the orientation cam is raised by the power cylinder 180. The cam is provided with helical surfaces 200 and with U-shaped cutouts 202, the upper extremities of which terminate at the lower end of the helical surfaces 200. In manufacturing this cam, a helix 204 is generated on the inner surface of the cam as the cutter generates the outer surface helix 200.

The U-shaped cutouts 202 are sized to accommodate the orientation cylinders 106 so that the latter will be received in the cutouts 202 as the cam is raised. If the orientation cylinders 106 are in alignment with the cutouts 202 within the cam 186, then the raising of the latter causes the orientation cylinder 106 to be received in the cutouts 202 and thereby insure that the carrier 54 is in the correct orientation. However, if the orientation cylinders 106 are not in alignment with the cutouts 202, raising of the cam 168 will cause the helical surfaces 200 to contact the orientation cylinders 106 and cause the latter to be guided on such surfaces whereby the shaft 88 is rotated to bring the orientation cylinders 106 into alignment with the cutout 202 to thereby orientate the carrier 54.

From the above description it will be seen that whenever the orientation cam is raised it will engage the orientation cylinders 106, irrespective of the position of the latter, to place the orientation cylinders within the cutout 202. The cams 168 along with the shaft 88 and the mechanical connection through to the carrier 54 are designed so that when the orientation cylinders 106 are accommodated in the cutout 202, the carrier 54 will be in the proper orientation. From the above description it can be seen, therefore, that at stations A, B and E where the orientation devices are located, the carrier 54 will always be orientated to the positions shown in FIG. 5.

Having described the construction of the various components of the rotary conveyor the operation will now be described. The transfer device 26 places two back-to-back tanks on the carrier 54 at station A. At this station, the orientation device 126 has been actuated so that the cam 186 engages the orientation cylinders 106 to insure that the carrier 54 is properly oriented as shown in FIG. 5, to receive the tanks. After the tanks have been placed on the carrier 54 at station A, the orientation cam is withdrawn and the conveyor is indexed by the index means 65 as previously described. At station B another orientation device orientates the platform 54 to the position shown in FIG. 5 so that the overhead reciprocal spraying device 59 is operable to move longitudinally back and forth to spray the covers of the tanks. This spraying device 59 is more fully covered in my co-pending application Serial No. 433,861, filed February 19, 1965. During the spraying the orientation cam 186 is left in its engaged position to insure that the carrier 54 is maintained in the desired position. After the covers are sprayed, the orientation cam 186 is withdrawn and the rotary conveyor then indexed by the indexing means 65 to station C. The clutch drive means 126 at station C is operatively connected to the carrier 54 to rotate the latter as the sides of the tank are sprayed by a stationary spray device 61 disposed laterally thereof. As will be recalled, the carrier 54 is rotated due to the engagement between the clutch plate 152 (FIG. 11) and the clutch plate 104 (FIG. 7) on the end of shaft 88, the clutch plate 152 being driven by the sprocket 154 which in turn is driven by the motor 176 (FIG. 12) through the sprocket 168. As previously described the clutch plate 152 is raised into engagement and lowered out of engagement by the power cylinder 140 (FIG. 11). After the sides of the tanks have been sprayed, the clutch plate 152 is disengaged from the clutch plate 104 and the indexing means 65 advances the rotary conveyor to the next station D. At this station, the sides of the tank are given another coating and here again the carrier 54 is rotated past a stationary spray device 63 disposed laterally thereof. The carrier 54 is rotated in the same manner as it was at station C using another clutch drive device 126 disposed at station C, but employing the same common drive that was used at station C. This common drive can best be seen in FIG. 5 where it is shown that the endless chain 164 drives sprocket 154 to station C and at station D.

After applying the second coat of spray, the clutch plates 152, 104 are disengaged at station D and the rotary conveyor once again indexed by the index means 65 to station E where another orientation cam 186 is actuated to orientate the carrier 54 to the position shown at station E in FIG. 5 so that the transfer machine 34, which may be similar to the transfer machine 26 except for the means for arranging the tanks in back-to-back relationship, can remove the tanks from the rotary conveyor. The orientation cam 186 at station E is then withdrawn and the rotary conveyor indexed to station A ready to start another cycle.

Although the above description traces the path of travel of a pair of tanks as the latter progress through the various stations, it will, of course, be understood that the above described operations at the various stations are going on simultaneously as different pairs of tanks are advanced.

As can best be shown in FIG. 1 the spraying operation at stations B, C, D, are performed within an enclosed booth 30 so that all the excess spray is confined within the booth and does not contaminate the surrounding atmosphere. It will be further observed that the various mechanical components of the rotary conveyor are protected from the spray. Thus the hub 50 houses the various gear and drive means as does the hollow radial arms 52. Also the clutch drive mechanisms 128 and the orientation mechanisms 126 may be encompassed within an enclosure underneath the hub. In this regard it is pointed out that the excess enamel spray tends to form a gum-like substance which would adversely affect the mechanical operating parts if they were not suitably enclosed as above described.

While various parts of the mechanism have been described as being driven by operating cylinders or rotary motors, it is within the scope of the invention to use hydraulic or pneumatic cylinders or rotary motors or to use other types of electrical or fluid driven motors to actuate the moving parts. The electric circuitry with the various limit switches and sensing devices have not been illustrated since it is felt that these may be readily supplied by an artisan skilled in the art.

The invention hereinabove described may be varied in construction within the scope of the claims, for the particular device selected to illustrate the invention is but one of many possible embodiments of the same. The invention, therefore, is not to be restricted to the precise details of the structure shown and described.

What is claimed is:

1. A rotary conveyor for conveying an article in a circular path through a plurality of successive operating stations spaced about said path comprising:
   (a) a plurality of rotatably journalled articles supporting means,
   (b) means for intermittently indexing each of said supporting means successively from one station to the next,
   (c) means operative with certain of said supporting means to effect rotation thereof when in certain of said stations, and
   (d) means operative with other of said supporting means to orientate and maintain the same stationary when at other of said stations.

2. A rotary conveyor for conveying an article in a circular path through a plurality of successive operating stations spaced along said path comprising:
   (a) a plurality of article supporting means,
   (b) means for moving each of said article supporting means in a circular path whereby each of said means is successively moved simultaneously from station to station,
   (c) means for intermittently indexing each of said supporting means in a successive manner from one operating station to the next,
   (d) means operative with at least one of said supporting means to effect rotation thereof in one of said stations, and
   (e) means operative with another of said supporting means to maintain the same stationary in another of said stations.

3. A rotary conveyor for conveying an article in a circular path through a plurality of successive operating stations spaced along said path comprising:
   (a) a plurality of article supporting means,
   (b) means for simultaneously moving each of said article supporting means in a circular path whereby each is successively moved from station to station,
   (c) means for intermittently indexing each of said supporting means successively from one operating station to the next,
   (d) means operative in several of said stations to effect rotation of said article supporting means indexed thereat,
   (e) said latter means including a clutch operative to engage and disengage with said article supporting means in each of said several stations,
   (f) and a common rotary drive means operatively connected to each of said clutch means of the several stations to effect rotation of the respective supporting means thereat when said clutch means are engaged to said support means, and (g) means operative with certain other of said supporting means to maintain said other supporting means stationary at other of said stations.

4. A rotary conveyor for conveying an article through a plurality of operating stations spaced in a circular path comprising:
(a) a base support,
(b) a hub rotatably journalled on said base support,
(c) a plurality of radially extending arms connected to said hub to rotate therewith,
(d) a carrier rotatably journalled on each of said arms,
(e) means for successively indexing said carriers through said stations,
(f) a drive means adapted to be operatively connected to said carriers at one or more of said stations to effect rotation thereof when said carriers are indexed thereto, and
(g) orientation means at other of said stations operatively associated with said carriers for maintaining the same stationary in a predetermined manner when said carriers are indexed to said other stations.

5. A rotary conveyor adapted to convey a plurality of articles in a circular path through a series of distinct operating stations fixed in predetermined spaced relationship along said path therein the articles carried thereon are operated upon in a series of progressive operations as the respective articles are moved from station to station with the respective operations at the respective stations being simultaneously performed comprising:
(a) a plurality of angularly spaced carrier means for supporting an article to be operated upon adapted to travel in a continuous circular path so that each is successively moved through each of the respective stations disposed in said path,
(b) means for indexing each of said carrier means in an intermittent manner from station to station,
(c) means operatively connected to each of said carrier means, to rotate the same,
(d) means disposed at one of said stations to engage with said latter means only at said one station to effect the rotation of the carrier means positioned thereat so that the article supported therein may be rotated as it is being operated thereon,
(e) said means for effecting rotation of the carrier means including
(1) a drive means,
(2) a clutch means operative to connect said carrier means in driving relationship with said drive means when said carrier means is moved into said one station,
(3) said clutch including a clutch plate operatively connected to the carrier,
(4) a complementary clutch plate,
(5) means for effecting reciprocal movement of said complementary plate toward said first mentioned plate to effect driving engagement therebetween,
(6) said latter means including a piston and cylinder assembly,
(7) said piston of said assembly including a piston rod having a shaft rotatably journalled thereto to define an axial extension thereof,
(8) a gear,
(9) means connecting said gear to said shaft whereby said shaft is slidably disposed with respect to said gear,
(10) means connected to said gear to effect rotation thereof and shaft connected thereto,
(11) and means for effecting reciprocal movement of said piston rod and complementary clutch plate connected thereto to place the same in driving relationship with said first mentioned plate.

6. A rotary conveyor adapted to convey a plurality of articles in a circular path through a series of distinct operating stations fixed in predetermined spaced relationship along said path wherein the articles carried thereon are operated upon in a series of progressive operations as the respective articles are moved from station to station with the respective operations at the respective stations being simultaneously performed comprising:
(a) a plurality of angularly spaced carrier means for supporting an article to be operated upon adapted to travel in a continuous circular path so that each is successively moved through each of the respective stations disposed in said path,
(b) means for indexing each of said carrier means in an intermittent manner from station to station,
(c) means operatively connected to each of said carrier means, to rotate the same,
(d) and a means disposed at one of said stations to engage with said latter means only at said one station to effect the rotation of the carrier means positioned thereat so that the article supported thereon may be rotated as it is being operated thereon,
(e) said means for effecting rotation of the carrier means including
(1) a drive means, and said means disposed at said one station includes,
(2) a clutch means for connecting said drive means into driving relationship with said carrier means when the latter is moved into said one station,
(3) said clutch means including a clutch plate operatively connected in driving relationship with the respective carrier means and movable in said circular path therewith,
(4) and a complementary clutch plate located at said one station adapted to engage and disengage with said first mentioned clutch plate, and
(5) said drive means being operatively connected to said complementary clutch plate whereby said carrier means is placed in driving relationship with said drive means when said clutch plates are engaged at said one station,
(f) means adapted to move said clutch plates relative to each other to effect the engagement thereof,
(g) said latter means including a piston and cylinder assembly,
(h) said piston including a piston having an extension rotatably journalled to the end of said rod,
(i) means operatively connecting said drive means in driving relationship to said extension,
(j) said complementary clutch plate being connected to said extension to rotate therewith so that said complementary clutch plate is moved into engagement with the other clutch plate when said piston and cylinder is actuated.

7. A rotary conveyor adapted to convey an article in a circular path through a series of distinct operating stations spaced along said path comprising:
(a) a stationary supporting base,
(b) a hub rotatably journalled on said base,
(c) a plurality of arms circumferentially spaced about said hub and extending radially outwardly therefrom,
(d) a carrier adapted to support an article carried on the end of each arm,
(e) indexing means for sequentially indexing each of said carriers from one station to the next,
(f) and means for rotating said carrier when indexed to at least one of said stations,
(g) said latter means including a spindle rotatably supporting said carrier on its respective arm,
(h) a mechanical drive linkage means connected in driving relationship with said spindle of said carrier to expect rotation thereof,
(i) a drive means,
(j) and a clutch means for connecting said drive means into and out of driving relationship with said mechanical means,
(k) said clutch means including a pair of complementary clutch plates including a driven clutch plate and a driving clutch plate, (l) said driven clutch plate being operatively connected to said mechanical means, (m) and said driving clutch plate being rotatably journalled on said base at said one of said stations, (n) and means for effecting actuation of one of said clutch plates for mixing the same into and out of driving relationship with the other clutch plate.

8. A rotary conveyor adapted to convey a plurality of articles in a circular path through a series of successively disposed operating stations spaced along said circular path comprising:

(a) a base support, (b) a hollow hub including upper and lower members connected in spaced relationship by a circumscribing wall, said hub being rotatably journalled to said base support for rotation relative thereto, (c) a plurality of tubular arms circumferentially spaced about the circumscribing wall of said hub and extending radially outwardly therefrom, (d) a spindle rotatably journalled on the end of each tubular arm, said spindle having one end terminating within its respective tubular arm and having the other end projecting outwardly therefrom, (e) a carrier connected to the extended end of said spindle, (f) indexing means disposed within said hub for sequentially indexing each of said carriers through said stations and for maintaining said carrier in the respective stations during the operation being performed thereat, (g) said indexing means including a positioning means fixed to the lower member of said hub opposite each of said stations, (h) an indexing arm journalled about the axis of said hub, said indexing arm being adapted to extend over said positioning means, (i) an actuator connected to the end of said indexing arm, said actuator being operative to engage and disengage said indexing arm in driving relationship with the positioning means of said hub, (j) means operative with said indexing arm to effect limited rotation thereof to successively advance said hub and connected carrier arms to the successive stations when said actuator is in engagement with said positioning means, (k) means for effecting rotation of each of said carriers, when the carrier is located in at least one of said stations, (l) said latter means including a driven shaft rotatably journalled within each of the respective tubular arms, (m) means connecting one end of the respective shafts in driving relationship with the spindle of the associated carrier, (n) means adapted to be connected to the other end of the respective shafts to effect the drive thereof, (o) said latter means including a rotary drive means, (p) a clutch means disposed opposite said one station, said clutch being operative to connect said shaft in driving relationship with said rotary drive means when said shaft and associated carrier is indexed to said one station, (q) and means for affecting the actuation of said clutch means.

9. A rotary conveyor adapted to convey an article in a circular path through a series of distinct operating stations spaced along said path comprising:

(a) a stationary supporting base, (b) a hub rotatably journalled on said base, (c) a plurality of arms circumferentially spaced about said hub and extending radially outwardly therefrom, (d) a carrier adapted to support an article thereon carried on the end of each arm, (e) indexing means for sequentially indexing each of said carriers through each of said stations, (f) said indexing means including a series of locating plates mounted in said hub so as to be angularly disposed opposite each of said stations, each of said plates having a hole therein, (g) an indexing arm journalled about the axis of said hub, (h) a rotating means for swinging said index arm between the locating plates of adjacent stations, (i) actuating means connected to the end of said indexing arm for engaging and disengaging with the hole in the respective plate disposed in alignment therewith whereby said hub and connected radial arms are indexed from one station to the next where said rotary means is actuated, and said actuating means is engaged in the hole of one of said aligned locating plates, (j) and means for rotating said carrier when indexed in at least one of said stations, (k) said latter means including a shaft rotatably supporting said carrier on the end of its respective arm, (l) a drive means, (m) a mechanical drive connecting said drive means in driving relationship with the shaft of said article support to effect rotation thereof, (n) and a clutch means for connecting said drive means into and out of driving relationship with said mechanical drive, (o) said clutch means including a pair of complementary clutch plates including a driven clutch plate and a driving clutch plate, (p) said driven clutch plate being operatively connected to said mechanical drive, (q) and said driving clutch plate being rotatably journalled on said base at said one station, (r) and means for effecting actuation of one of said clutch plates for moving the same into and out of driving relationship with the other of said clutch plate.

10. A clutch means for engaging and disengaging a driving means into and out of driving relation with respect to a driven means comprising:

(a) a clutch plate operatively connnected in driving relationship with said driven means, (b) a complementary clutch plate, (c) means for effecting reciprocal movement of said complementary plate toward said first mentioned plate to effect driving engagement therebetween, (d) said latter means including a piston and cylinder assembly, (e) the piston of said assembly including a piston rod having a shaft rotatably journalled thereto to define an axial extension thereof, (f) a gear connected to said shaft whereby said shaft is slidably disposed with respect to said gear, (g) means keying said gear to said shaft to rotate therewith, (h) and means connecting said gear in driving relationship with said drive means to effect rotation of the shaft connected thereto.

11. An article handling device comprising:

(a) a support means for supporting an article thereon, (b) said support means being mounted for rotation about a given axis of rotation, (c) an orientation means adapted for movement between operative and inoperative positions cooperatively associated with said article support to determine the rotation thereof about said axis of rotation so that said article support when stationary is positively orientated in the same predetermined angular relationship relative to said axis of rotation each time said orientation means is rendered operative, and (d) said orientation means including an orientation cam and means cooperatively associated therewith for moving the same into cooperating engagement with said article support.

12. An article handling device comprising:
(a) a support means for supporting thereon an article,
(b) means for rotating said support means about a given axis of rotation,
(c) said rotation means including a clutch member operatively connected to said support means to rotate therewith,
(d) an orientation means adapted for movement between operative and inoperative positions cooperatively associated with the clutch member of said article support to determine the rotation thereof about said axis of rotation so that said article support is positively oriented in the same predetermined angular relationship relative to said axis of rotation each time said orientation means is rendered operative, and
(e) said orientation means including an orientation cam and means cooperatively associated therewith for moving the same into cooperating engagement with said clutch member.

References Cited by the Examiner

UNITED STATES PATENTS 2,109,505 3/1938 Rue.
2,708,502 5/1955 Carter.

FOREIGN PATENTS 651,805 10/1934 France.

EVON C. BLUNK, *Primary Examiner.*

EDWARD A. SROKA, *Examiner.*